Patented Dec. 3, 1935

2,022,710

UNITED STATES PATENT OFFICE 2,022,710

PROCESS OF COLORING SYNTHETIC RESIN ARTICLES

Gustavus J. Esselen, Swampscott, Mass., assignor to The Specialty Guild, Inc., Convent, N. J., a corporation of Massachusetts No Drawing. Application December 29, 1933, Serial No. 704,473

11 Claims. (Cl. 8—5)

The present invention relates to colored synthetic resin articles and processes of producing the same.

The manufacture of colored synthetic resin articles has been accomplished in the past by incorporating with the resin suitable pigments, lakes or dyes. The colored resins were then hardened or cured according to the methods known to those skilled in the art. While this method of producing colored objects from synthetic resins yields articles of satisfactory color, it possesses certain disadvantages in commercial application. For example, the fabricator of colored articles is compelled to keep at hand unfabricated or semi-fabricated shapes in a wide variety of colors in order to be able to meet the demands for various colors. Moreover, a certain time interval must necessarily ensue during the process of curing and fabricating which delays the meeting of demands. The pre-fabrication and retention in stock of colored articles is not practical from the manufacturer's standpoint inasmuch as the vagaries of fashion are such that he is unable to predict the demand.

It is the object of my invention to provide a method of coloring synthetic resins, which method will be simple in operation and require only a short time for its accomplishment and which will further provide sufficent penetration of the color into the article to resist such operations as buffing and polishing and the ordinary wear to which the colored article may be subjected; the method to be applicable to the resinous masses at any stage in the curing procedure at which the resinous masses have assumed an essentially solid character but are still capable of being surface softened or plasticized. Attempts have been made to color cast phenol-aldehyde resins by immersion in an aqueous solution of a basic dye, preferably at the boiling temperature. Such a method is not satisfactory, however, in that no appreciable penetration of the dyestuff is accomplished and the colored surface is removed wholly or in part by polishing or in a short time by ordinary wear. Furthermore even a slight scratch discloses the uncolored material directly under the surface. My invention differs from this procedure, however, and brings about sufficient penetration (about $\frac{1}{64}$ to $\frac{1}{32}$ inch or more) to provide an essentially usable and practical article in which ordinary buffing, polishing, wear or scratching does not disclose an uncolored surface.

This I accomplish by dyeing the resinous articles in an aqueous solution of a dyestuff in which is incorporated a material capable of softening or plasticizing the surface of the resin while subjected to the dyeing procedure without materially interfering with subsequent hardening or re-hardening of the resin. The dyeing may be carried out at normal atmospheric pressure, or if more rapid and deeper penetration of the color is desired, it may be conducted at pressure above atmospheric. For such softening materials for the phenol-aldehyde types of resin, I may use phenol-like substances including phenolic bodies such as phenol, ortho-cresol, para-cresol, meta-cresol and homologues of these materials, as well as other substances which will soften the surface. Softening materials of the type just mentioned may also be used for resins of the alkyd type. These softening agents are water soluble and go completely into solution when the bath is heated. As above noted, the dyes employed are also water soluble. The effect of softening or plasticizing agents is enhanced and controlled, and the application of such softening agents is simplified, by incorporation of blending agents into the dyeing solution. These blending agents are materials mutually soluble in water and in the softening material and by the addition of suitable quantities of such blending agents, mixtures of water and, for example, phenol, of such proportions that the mixture would otherwise consist of two phases at room temperature, may be rendered homogeneous. It is preferable to use blending agents which are not volatile under the conditions of application of color, but inasmuch as the use of pressure or a return condenser is permissible, it is possible to retain volatile blending materials in the coloring bath. As examples of suitable blending materials I may cite monohydric aliphatic alcohols of less than five carbon atoms, polyhydric aliphatic alcohols and monoester- or monoether-derivatives of polyhydric alcohols. The blending agents accomplish the further purpose of leveling the dyeing and of preventing damage to localized areas of the object being colored, which is sometimes observed when such blending agents are not employed. While I prefer to employ blending agents when coloring resin articles, I may omit the blending agents and color in an aqueous solution of dyestuff to which the softening agent has been added. Under these conditions the coloring bath may or may not be homogeneous depending on the proportion of softening agent added and upon the temperature.

My process consists in starting with resinous materials which are impermeable to ordinary dye-baths and rendering such materials permeable to the dye-baths used, by incorporating therein certain agents having the property of softening the resins. The incorporation of softening agents in the dye-baths may or may not be facilitated by use of blending agents.

In addition to the other colors which I may produce on phenol-aldehyde resins by means of my process, I may also produce a deep jet-black on either pigmented or clear resins by the proper selection of dyestuffs.

Resins which are curable to an infusible insoluble condition should preferably be dyed before such final curing, if the articles are to be cured to this stage. For example, phenol-aldehyde resins are commonly regarded as having three stages in curing; the A stage in which the resin is first liquid and then becomes solid on further heating, the B stage arrived at by further heating in which the resin is still soluble and fusible, and the C stage arrived at by still further heating in which the resin is transformed into its final insoluble and infusible completely cured condition. In dyeing phenol-aldehyde resins in accordance with my process, the articles should be dyed while the resins are in the partially cured stage when the softening agents can soften the surface to permit the penetration of the dye. Thereafter the resin may be cured, if desired, to the insoluble infusible condition. However, some finished articles may be made from phenol-aldehyde resins in the B stage so that complete curing may not be required as an after-treatment, although the articles are usually heated to reharden the surface.

The proportions of the various ingredients incorporated in the dye-bath will naturally vary with the condition of the resin and the results desired. Thus I have found that as the proportion of softening agent is increased, greater penetration and more softening of the surface of the resin mass is obtained. To obtain a given penetration of color, the amount of softening agent required increases with the degree of cure of the resin mass to be colored. While I have obtained the most satisfactory results with concentration of softening agents ranging from 5 to 20% by weight of the dyeing bath, I do not limit myself to these concentrations inasmuch as improvement in penetration is noted at concentrations lower than 5% and it is possible to use concentrations greater than 20%, especially if the time in the dye-bath is shortened. In respect to the blending agent, I prefer to use concentrations ranging from 45 to 55% of the dye-bath by weight but again do not limit myself to this range, inasmuch as improvement in the solubility of the softening agent and diminution of damage to local areas is noted with concentrations as low as 1%. Moreover, the chief reasons for using concentrations of 55% or lower are those of economy as dye-baths of greater concentration of the blending agent give satisfactory results, it only being necessary to have a good solution of the dyestuff. The concentration of dyestuff is naturally varied to obtain the shade desired.

I have found that, in general, the penetration of the color in any dye-bath will increase as the time in the bath is prolonged. However, the rate of penetration is considerably diminished after the first one and one-half hours at boiling temperature and I prefer to continue the dyeing procedure from one to two hours. I have also found that the penetration may be increased by use of pressures greater than atmospheric.

In practicing my invention I may use either clear or pigmented resins with or without fillers other than pigments. While I prefer to use either water-white clear resins or white pigmented resins, I have found that many interesting effects may be obtained by dyeing resins which have previously been filled and/or pigmented and/or colored, as, for example, in the process of manufacture.

The following examples which show how the invention may be practiced are given by way of illustration only and are in no sense limiting:

*Example 1*

|  | Grams |
|---|---|
| Water | 270 |
| Glycerine (blending agent) | 450 |
| Phenol (softening agent) | 180 |
| Methylene blue | 0.1 |

An article comprising a phenol-aldehyde resin immersed in the above bath at a temperature of 100° centigrade for one and one-half hours is dyed to a blue color and the coloring shows an appreciable penetration into the mass.

*Example 2*

|  | Grams |
|---|---|
| Water | 120 |
| Glycerine | 200 |
| Mixed cresols | 80 |
| Chrysoidine | 0.2 |

This dye-bath is capable of coloring phenol-aldehyde resin articles when they are immersed in it at 100° centigrade for from one to two hours.

*Example 3*

|  | Grams |
|---|---|
| Water | 120 |
| Diethylene glycol | 200 |
| Phenol | 80 |
| Rhodamine | 0.1 |

An article of phenol-aldehyde resin placed in the above dye-bath while the bath is held at a temperature of 90° centigrade is colored with appreciable penetration of the dyestuff into the resinous mass in about two hours.

*Example 4*

|  | Grams |
|---|---|
| Water | 120 |
| Glycerine | 200 |
| Phenol | 80 |
| Methylene blue | 6 |
| Chrysoidine | 2 |
| Rhodamine | 0.8 |

Phenol-aldehyde resin articles of either the clear or pigmented type are dyed a deep jet-black by one and one-half hours' immersion in this bath at the boiling temperature.

*Example 5*

|  | Grams |
|---|---|
| Water | 360 |
| Glycerine | 450 |
| Phenol | 90 |
| Rhodamine | 0.54 |
| Phosphine | 0.18 |

Pigmented "Glyptal" resin is colored bright red by one and one-half hours' immersion in this bath at the boiling temperature.

While I prefer to add the softening agent to the dye bath, the surface may be first softened by a softening agent and then immersed in the dye-bath as separate operations.

The process may be employed for surface coloring a wide variety of articles made from synthetic resins, such, for example, as bracelets, beads, toilet articles, umbrella handles, etc., particularly such articles as are subjected to buffing and polishing operations or to scratching and wear. While the process has been described with more specific reference to the surface coloring of articles made from phenol-aldehyde resins, as these are at present commercially the most important, the process may be applied for the surface coloring of other synthetic resins, such as alkyd, Glyptal, vinyl, and so forth.

It is therefore to be understood that the invention is not limited to its described embodiments but may be otherwise embodied and practiced within the scope of the following claims.

I claim:

1. The process of surface coloring synthetic resin articles, which comprises softenting the surface to be colored with a water soluble softening agent in aqueous solution and dyeing the softened surface with a water soluble dye in aqueous solution.

2. The process of surface coloring synthetic resin articles which comprises subjecting the surface to be colored to a softening bath which softens but does not dissolve the resin, and dyeing the softened surface with a water soluble dye in aqueous solution.

3. The process of surface coloring synthetic resin articles, which comprises subjecting the surface to be colored to an aqueous bath containing a water soluble softening agent and a water soluble dye.

4. The process of surface coloring synthetic resin articles, which comprises subjecting the surface to be colored to a heated aqueous bath containing a water soluble softening agent and a water soluble dye.

5. The process of surface coloring synthetic resin articles, which comprises subjecting the surface to be colored to an aqueous bath containing a softening agent, a water soluble dye and a blending agent mutually soluble in water and the softening agent.

6. The process of surface coloring phenol-aldehyde resin articles, which comprises softening the surface to be colored while in an incompletely cured state with a phenolic water soluble softening agent in aqueous solution and dyeing the softened surface with a water soluble dye in aqueous solution.

7. The process of surface coloring phenol-aldehyde resin articles, which comprises softening the surface to be colored while in an incompletely cured state with a phenolic water soluble softening agent in aqueous solution and dyeing the softened surface with a water soluble dye in aqueous solution, and thereafter rehardening the dyed surface.

8. The process of surface coloring phenol-aldehyde resin articles, which comprises subjecting the surface to be colored while in an incompletely cured state to an aqueous bath containing a phenolic softening agent and a water soluble dye.

9. The process of surface coloring phenol-aldehyde resin articles, which comprises subjecting the surface to be colored while in an incompletely cured state to an aqueous bath containing a phenolic softening agent, a water soluble dye and a blending agent mutually soluble in water and in the phenolic softening agent.

10. The process of surface coloring synthetic resin articles, which comprises softening the surface to be colored with a softening agent and dyeing the softened surface with a water soluble dye in aqueous solution.

11. The process of surface coloring synthetic resin articles, which comprises subjecting the surface to be colored to an aqueous bath containing a softening agent and a water soluble dye.

GUSTAVUS J. ESSELEN.